United States Patent [19]

Iacoviello et al.

[11] 4,219,454
[45] Aug. 26, 1980

[54] VINYL ACETATE COPOLYMER EMULSIONS FOR PAINT

[75] Inventors: John G. Iacoviello, Somerville, N.J.; Wiley E. Daniels, Easton, Pa.

[73] Assignee: Air Products and Chemicals, Inc., Allentown, Pa.

[21] Appl. No.: 939,557

[22] Filed: Sep. 5, 1978

[51] Int. Cl.² ............................................. C08f 218/08
[52] U.S. Cl. ........................ 260/29.6 T; 260/29.6 R; 260/29.6 TA; 526/329.5; 526/331
[58] Field of Search ................... 260/29.6 R, 29.6 T, 260/29.6 TA

[56] References Cited

U.S. PATENT DOCUMENTS

| | | | |
|---|---|---|---|
| 3,369,008 | 2/1968 | Hurwitz | 260/80.72 |
| 3,563,944 | 2/1971 | Bauer | 260/29.6 R |
| 3,578,618 | 5/1971 | Beardsley | 260/29.6 R |
| 3,844,990 | 10/1974 | Lindemann | 260/29.6 R |
| 4,046,730 | 9/1977 | Tortai | 260/29.6 R |
| 4,094,841 | 6/1978 | Mani | 260/29.6 Z |
| 4,094,849 | 6/1978 | Oyamada | 260/29.6 R |
| 4,123,405 | 10/1978 | Oyamada | 260/29.6 R |

*Primary Examiner*—Paul R. Michl
*Attorney, Agent, or Firm*—Russell L. Brewer; E. Eugene Innis

[57] ABSTRACT

This invention relates to a latex composition particularly suited as a paint vehicle for the manufacture of semi-gloss and flat interior paint compositions. The latex composition comprises from about 40 to 70% by weight of copolymer resin particles having at least 50% vinyl acetate polymerized therein, the particles being substantially spherical and characterized in that not more than 5% of the particles have a size greater than 0.65 microns and not more than 5% have a particle size less than 0.33 microns. In the preferred instance, the resin particles comprise vinyl acetate, a lower alkyl acrylate and a conventional wet adhesion monomer, the combination consisting of from about 80 to 90% vinyl acetate, 10 to 20% of lower alkyl acrylate, e.g., butyl acrylate and 0.2 to 1.5% of the wet adhesion monomer.

13 Claims, 7 Drawing Figures

VINYL ACETATE COPOLYMER EMULSIONS FOR PAINT

BACKGROUND OF THE INVENTION

1. Field of the Invention

This invention relates to latex compositions or paint vehicles as they are sometimes referred for semi-gloss and flat interior paint compositions. Latex paint compositions have captured a significant portion of the indoor and outdoor paint market because they have several advantages as compared with the organic solvent type. Three significant advantages are: the paints offer an easy mechanism for cleanup, there is substantially no air pollution and there is a reduced possibility of fire hazard. On the other hand, the coating properties and storage stability of the latex paints have been somewhat inferior to those of the solvent type, particularly in obtaining desired film thickness and obtaining good adhesion.

Two types of emulsions commonly used in formulating latex paints include the all acrylic system, e.g., the systems using copolymerized methyl methacrylate, butyl acrylate, 2-ethylhexylacrylate with small proportions of acrylic acid, etc., as may be desired, and vinyl acetate formulations usually in combination with a small proportion of a lower alkyl acrylate, e.g., 2-ethylhexyl acrylate, methyl methacrylate or butyl acrylate. Heretofore, the all acrylic system has been used in premium quality paints as the emulsions have provided for good water resistance, desired leveling, film hardness, durability, scrubability, etc. The vinyl acetate-acrylic copolymer systems have been utilized in formulating interior flat and semi-gloss paints and exterior house paints, and the vinyl acetate-butyl acrylate latices result in paint films with excellent toughness, scrub resistance and durability, while the vinyl acetate-dibutyl maleate emulsions have good abrasion resistance and flexibility as well as durability.

Wet adhesion, i.e., the quality of adhering to a previously painted, aged surface under wet or moist conditions, has been imparted to both acrylic systems and vinyl acetate systems by polymerizing a wet adhesion monomer into the copolymer. Typically, these monomers have terminal olefinic unsaturation at one end, and a terminal ureido or urea functionality at the other end of the monomer. Although these monomers increase the ability of the emulsion to adhere to a previously painted film under moist conditions, these monomers sometimes have been difficult to polymerize into a system, particularly an acrylic system, and achieve other desired properties in the paints, thus wet adhesion of the paint vehicle is imparted by blending different kinds of acrylic polymer emulsions to obtain the overall properties desired in a paint vehicle, namely, durability, wet adhesion, scrubbability, flexibility, good leveling, abrasion resistance, toughness, etc.

2. Description of the Prior Art

Specific examples of acrylic and vinyl ester paint vehicle systems are shown in the following U.S. Patents.

U.S. Pat. No. 3,969,296 discloses a process for producing a vinyl acetate emulsion having improved adhesion characteristics against usual wet-cleaning with a cloth, sponge, etc. The emulsion is prepared by copolymerizing a small amount of a glycidyl ester of an alpha-beta ethylenically unsaturated acid with vinyl acetate followed by neutralization with ammonia.

U.S. Pat. No. 3,985,698 discloses an emulsion suited for improving the coating property and storage stability of emulsion paints by adding an amine, ammonia, or base solubilized acrylic resin produced by reacting a tertiary amine with an amino alkyl acrylate to a vinyl acetate or acrylic emulsion.

U.S. Pat. No. 3,563,944 discloses a colloid-free vinyl acetate emulsion suited for paint formulation having good scrub resistance, film forming properties, mechanical stability, etc. The copolymer consists of vinyl acetate and a lower alkyl acrylate, or an alkyl maleate. Enhanced stability is imparted by polymerizing a portion of the monomers in a colloid-free aqueous medium and then adding more monomer during the course of reaction and using a nonionic surfactant to stabilize the polymerization.

U.S. Pat. Nos. 3,369,008; 3,366,613; 2,940,950; 2,881,171; 2,727,019; 3,509,085; 2,980,652; and 3,356,654 disclose various paint emulsion systems which include a functional monomer for imparting wet adhesion to the emulsion. As noted in U.S. Pat. No. 3,509,085, one of the difficulties with many of the prior art latex paints was that they did not adequately adhere to previously painted surfaces which are glossy or chalky, and they did not adhere to surfaces previously painted with oil-based paints. By including a wet adhesion monomer such as described in the patents, the difficulty was overcome. In each of these patents, the functional monomer has vinyl unsaturation, except for U.S. Pat. No. 3,509,085, which has allylic unsaturation. All disclose terminal ureido functionality, e.g., a heterocyclic urea functionality such as an alkyl heterocyclic urea such as ethylene urea.

SUMMARY OF THE INVENTION

This invention relates to an improved vinyl acetate copolymer emulsion particularly suited as a vehicle for interior and exterior paints, particularly interior semi-gloss paints. The emulsion has a significantly better overall combination of physical properties than achieved heretofore in any of the vinyl acetate emulsions used in paint compositions. In many instances the combination of physical properties approaches the physical properties heretofore observed in an all acrylic system, and in some instances, the physical properties even surpass the all acrylic systems which include those with wet adhesion characteristics.

The improvement in the latex emulsion comprises effecting polymerization of the vinyl acetate copolymer so that the resin particles in the emulsion are substantially spherical in shape and are characterized in that not more than about 5% of the total number of particles in the latex composition have a size greater than about 0.65 microns, and not more than about 5% of the total number of particles have a particle size less than 0.33 microns, and the differential between the particles at the 25% level on the large side and 25% on the small side is not more than about 0.15 microns. In other words, the copolymer particles are characterized in that a small percentage, up to about 5% of the total number of particles in the latex, have a size greater than 0.65 microns, and a small percentage, up to about 5% of the particles, have a size smaller than about 0.33 microns. The requirement that the particle size distribution at the 25% level of a maximum 0.15 microns indicates that the particles must be substantially monodisperse. As a result, by maintaining a small balance of small particles and large particles in an emulsion, it is possible to achieve good leveling and flow with the latex emulsion.

Specific advantages of the vinyl acetate emulsion for use as a paint vehicle in the formulation of interior flat and semi-gloss paints include:

an ability to impart good flow and leveling to a paint composition;

wet adhesion to the paint film with significant improvements over paint films prepared utilizing blends of polymers with one component of the blend being prepared with the wet adhesion monomer;

economy of vinyl acetate systems thus permitting substitution of a less expensive emulsion than an all acrylic system;

an emulsion which imparts substantial gloss characteristics to the paint composition; and other desirable features commonly observed in vinyl acetate emulsions such as scrubbability, toughness, flexibility, abrasion resistance, print resistance, etc.

THE DRAWINGS

DESCRIPTION OF THE PREFERRED EMBODIMENTS

Figure 1:
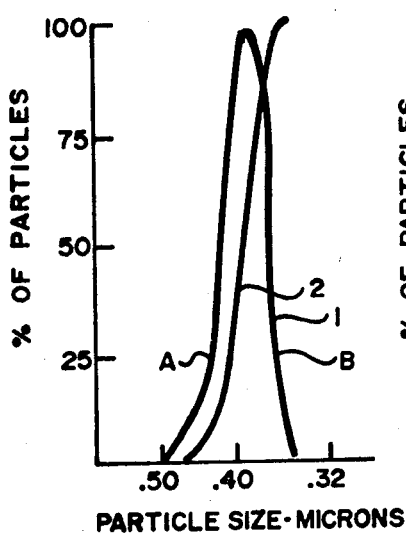
FIG. 1 is a particle size distribution curve for a vinyl acetate-butyl acrylate emulsion containing an allylic functional wet adhesion monomer, the emulsion being formed in a manner to give the desired particle size distribution of this invention.

The emulsions suited for practicing the invention are vinyl acetate latices. For interior and exterior usage, the vinyl acetate generally is copolymerized with monomers copolymerizable therewith, i.e., lower alkyl acrylates, e.g., a $C_1$-$C_6$ ester of acrylic and methacrylic acid which includes methyl methacrylate, ethyl acrylate, butyl acrylate, 2-ethylhexyl acrylate; olefins, e.g., ethylene; alkyl esters of alpha-beta unsaturated dicarboxylic acids, e.g., dibutyl maleate, dibutyl fumarate, dioctyl maleate, dibutyl itaconate; vinyl chloride, vinyl esters, e.g., vinyl butyrate, vinyl propionate; vinyl ethers such as methylvinyl ether, n-butyl vinyl ether; and unsaturated carboxylic acids and amides, e.g., acrylic, and methacrylic acid, acrylamide and methacrylamide.

To achieve wet adhesion in the emulsion, which is required in most paint applications, a wet adhesion monomer is usually interpolymerized with the vinyl acetate to form a vinyl acetate terpolymer. They can also be copolymerized with other monomers and blend with vinyl acetate copolymers to give wet adhesion. By wet adhesion monomer, I mean those monomers having allylic or acrylic unsaturation in one portion of the molecule and pendant urea or acylic and cyclic ureido functionality at the other end. Exemplary structural formulas of suitable wet adhesion monomers are:

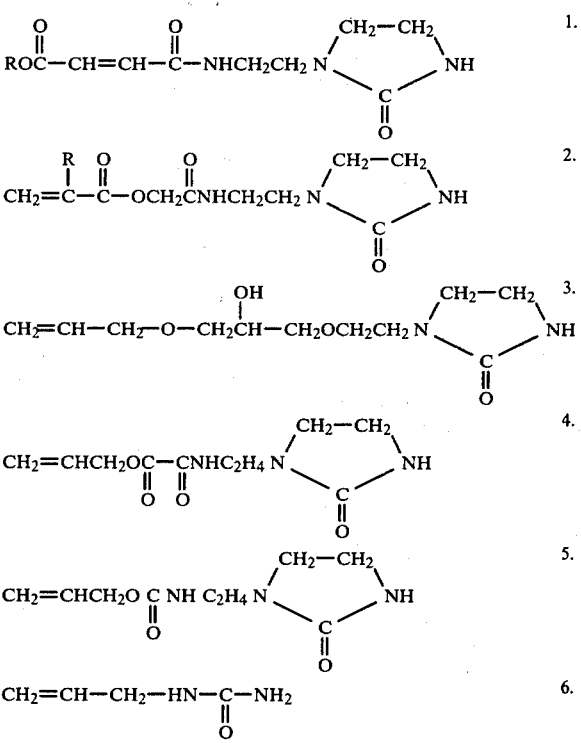

Examples of wet adhesion monomers are found in U.S. Pat. Nos. 3,356,654; 3,366,613; 2,980,652; 3,509,085; 2,727,019 and 2,881,171. Examples of functional monomers having allylic unsaturation are noted in commonly assigned U.S. Ser. No. 709,916, having a filing date of July 29, 1976; U.S. Ser. No. 709,677, having a filing date of July 29, 1976 and U.S. Ser. No. 883,554 and a filing date of Mar. 6, 1974. The vinyl and allylic wet adhesion monomers disclosed in the patents and patent applications are incorporated by reference. Of these wet adhesion monomers, though, the preferred is represented by formulas 5 and 6.

The copolymers in the emulsions broadly will contain at least 25%, and generally from about 80 to 95% vinyl acetate, 15 to 20% of a comonomer, e.g., a lower alkyl acrylate or olefin and 0.2-2.5% of a wet adhesion monomer. The particular emulsion system best suited for interior semi-gloss applications is a vinyl acetate-butyl acrylate or vinyl acetate-ethylene copolymer having a wet adhesion monomer interpolymerized therein; and in that instance, the vinyl acetate content is from about 80 to 95% by weight, and preferably 85 to 90% by weight, the butyl acrylate or ethylene is included in a proportion of from about 5 to 18.5%, and preferably from about 13.5 to 8.5% by weight, and the wet adhesion monomer is included at about 0.5-1.5% by weight.

In terms of a tetrapolymer, we have found that a composition containing broadly from 25-65% vinyl chloride, 30–65% vinyl acetate, 10–15% ethylene and 0.2 to 2.5% of a wet adhesion monomer is most satisfactory. The presence of vinyl chloride greatly enhances the toughness and flexibility of the film.

We believe the significant feature for providing for the overall combination of properties in a latex paint formulation is attributable to the particle size range present in the emulsion. The copolymer particles in the latex of this invention have a very narrow particle size distribution with a small proportion of particles larger than 0.65 microns with the largest, but not larger than 0.9 microns, and a small proportion having a particle size less than 0.33 microns with the smallest being not smaller than about 0.1 micron. Preferably, the range if from 0.6 to 0.35. When the proportion of large particles is increased above about 5%, e.g., 10% at the 0.75–0.9 micron range, the resulting paint composition will have good leveling characteristics but poor gloss. On the other hand, where the concentration of fines, i.e., those particles having a size less than 0.33 microns, is above about 10%, the paint will have good gloss but poor flow and leveling characteristics. As a result, the paint with too many fines will show ridges and brushmarks.

In addition to the narrow size distribution recited, the curve is characterized to the extent the particles at the 25% differential level; i.e., points A and B on the differential curve, are not more than 0.15 microns apart. When the curve opens as in a "bell shape" (see FIG. 4), the flow properties and gloss become more erratic. Generally, where the curve is extremely narrow, i.e., 0.10 microns or less as in FIGS. 1 and 6, which shows a substantially monodisperse condition, better overall results in terms of physical properties are obtained.

There has been found only one way which is consistent for preparing the emulsions of this invention. That technique is to use a standard premix of protective colloid, surfactant, and oxidizing agent and delay the addition of monomer, additional surfactant and reducing agent. More specifically, a standard premix containing water, protective colloid, surfactant, free radical initiator and buffer, is charged to a primary vessel. In the premix, the protective colloid preferably is hydroxyethyl cellulose although other protective colloids such as polyvinyl alcohol, casein, hydroxyethyl starch, carboxymethyl cellulose can be used. The protective colloid is added in conventional amounts, e.g., from about 0.05–4.5% by weight of the monomer, and preferably from about 0.8–1.5%.

The surfactants are used in conventional amounts, i.e., 0.5–5% by weight of the latex to stabilize the emulsion. Generally, they are nonionic emulsifying agents and include polyoxyethylene condensates, e.g. polyoxyethylene aliphatic ethers, polyoxyethylene aralkyl ethers, condensates of ethylene oxide and tall oil acids and the like. Preferred nonionic emulsifying agents are sold under the trademark "Pluronic", and have the general formula: $HO(C_2H_4O)_a(C_3H_6O)_b(C_2H_4O)_cH$ where a, b, and c are integers of 1 (or above) and include polyoxyethylene-polyoxypropylene glycols, in which the polyoxypropylene chain has a molecular weight of 1500–1800, and the polyoxyethylene content is from 40–90% of the total weight of the molecule. Examples of preferred surfactants are Pluronic F-68 and Pluronic L-64, both being a polyoxyethylene-polyoxypropylene glycol, but with F-68 having a polyoxyethylene content of 80–90%, and L-64 having a polyoxyethylene content of 40–50% by weight of the molecule.

Another class of nonionic surfactants are sold under the trademark IGEPAL, and are generally polyoxyethylene aralkyl ethers such as polyoxyethylene nonylphenyl ether. Two preferred surfactants include IGEPAL CO-630 which has a cloud point between 126°–133° F. and IGEPAL CO-887, which has a could point above 212°. Both are polyoxyethylene nonylphenyl ethers.

The free radical initiating catalyst used to effect polymerization is commonly referred to as a redox catalyst. The redox catalysts, as known, comprise an oxidizing agent and reducing agent. The oxidizing and reducing components can be any of those conventionally used in vinyl acetate emulsion polymerization. Examples of preferred oxidizing components are hydrogen peroxide, potassium persulfate, t-butyl peroxypivalate, etc. and preferred reducing agents are ferrous ammonium sulfate and sodium or zinc formaldehyde sulfoxylate.

In forming the premix water, the protective colloid, e.g., hydroxyethyl cellulose and free radical initiation oxidizing agent are charged to a primary vessel in conventional amount. Then from about 0–70%, and typically 0–20% of the total surfactant employed is charged to the primary vessel and mixed therein. The remainder of the surfactant is mixed with the monomers in a secondary vessel or added separately. In either case, they are added as a delay. To polymerize then, the monomers and reducing agent, sodium formaldehyde sulfoxylate, are added to the primary vessel over a period of time and at a rate such that the unreacted vinyl acetate in the primary vessel is maintained at about 3–5% by weight of the emulsion or latex. After all of the monomers are added to the primary vessel, the residual vinyl acetate then is reduced to less than 0.5% by addition of additional oxidizing agent and reducing agent. At the end of the polymerization, the pH is adjusted to about 5.5, usually with ammonium hydroxide.

With respect to the polymerization procedure, the protective colloid, particularly the cellulose ether, is used to maintain emulsion stability. Higher levels of colloid tend to enhance stability and in addition increase particle size. The surfactant also provides emulsion stability. But, in contrast to the colloid, surfactant tends to reduce particle size when present in the initial polymerization and exhibit better particle size affect when added as a delay. By working the protective colloid and surfactant together, particle size optimization can be achieved.

In practicing the above procedure to form a latex having a desired particle size, it probably will be necessary, utilizing the principles set forth regarding the effect of colloid and surfactant, to adjust the level of protective colloid or surfactant concentration in the primary vessel or surfactant which is added as a delay. For example, if initially the particle size distribution curve shows a higher percentage of small particles than is desired, then the protective colloid should be increased and surfactant fraction in the primary vessel reduced and added as a delay. If, on the other hand the particle size is large, the particle size can be reduced by adding a surfactant. As a rule of thumb, the particle size can be decreased by adding surfactant to the primary vessel and increased by adding surfactant to the secondary vessel. Alternatively, particle size can be increased by adding colloid or decreased by reducing colloid. Thus, by bracketing the particle size distribution, it is relatively easy to hone in and produce latex having the desired particle size distribution.

Agitation is another variable which can affect particle size in the polymer emulsion. Agitation should be mild so that appropriate heat transfer can be achieved and product stability maintained. Vigorous agitation is to be avoided. In terms of particle size control, if larger particles are desired, the agitation rate can be reduced; and if smaller particles are required, the degree of agitation can be increased. If agitation cannot be modified, then surfactant or protective colloid adjustment must be made. This is why in commercial operations where agitation is vigorous to effect heat transfer, most of the surfactant is added as a delay rather than to the primary vessel.

The following examples are provided to illustrate preferred embodiments of the invention and are not intended to restrict the scope thereof. All percentages are expressed as weight percentages, and all temperatures are in degrees centigrade.

EXAMPLE 1

Emulsion Polymerization With Surfactant and Protective Colloid

A 15 gallon stainless steel pressure reactor was used as the primary vessel, and to this vessel were charged:

| COMPOUND | GRAMS |
| --- | --- |
| Deionized Water | 7348 |
| Natrosol 250JR (2.0% solution) hydroxyethyl cellulose | 10,069.9 |
| Igepal CO-887 | 438.8 |
| Igepal CO-630 | 102.5 |
| Pluronic F-68 | 76.7 |
| Pluronic L-64 | 25.5 |
| Sodium Persulfate | 84 |
| Ferrous Ammonium Sulfate | 0.5 |
| Sodium Benzoate | 56 |

The pH of the resulting premix solution was 6.4.

After the above contents were charged to the primary vessel, mild agitation was effected using a single turbine stirrer rotated at 75 rpm with the contents heated to 62° C. The vessel was then purged with nitrogen to remove oxygen.

A monomer mixture was formed in secondary vessel 1 and included:

SECONDARY VESSEL 1

| COMPOUND | GRAMS |
| --- | --- |
| Vinyl acetate | 22,680 |
| n-butyl acrylate | 2,540 |
| Pluronic F-68 | 230.4 |
| Pluronic L-64 | 76.7 |

In secondary vessel 2 there were charged:

SECONDARY VESSEL 2

| COMPOUND | GRAMS |
| --- | --- |
| Distilled water | 2,630.8 |
| Wet Adhesion Monomer of Formula 5 | 189 |
| Sodium Persulfate | 42 |
| Sodium Benzoate | 14 |

With constant agitation in the primary vessel, the contents from secondary vessel 1 and secondary vessel 2, were added to the primary vessel over a three hour period. The temperature was maintained at 62° C. and the vinyl acetate monomer in the primary vessel, based on the weight of the latex, was maintained between 3-5%. The appropriate vinyl acetate content was maintained by delaying, from a third vessel, the amount of a reducing agent solution consisting of 1392 grams distilled water and 7 grams sodium formaldehyde sulfoxylate to the primary vessel. After the contents from secondary vessels 1 and 2 and reducing solution from vessel 3 were added to the primary vessel, the vinyl acetate monomer content was reduced to less than 0.5% by weight of the latex by adding a catalyst solution consisting of 5 ml of a 70% solution of tertiary-butyl hydroperoxide in 20 milliliters water and 2 milliliters of Igepal CO-887 surfactant. At the completion of the polymerization, the pH was 2.5 and it was adjusted to 5.5 by adding a 7% ammonium hydroxide solution. The emulsion solids were 55.5%.

The particle size of the emulsion was measured by using a Joyce Loebel disc photosensitometer using a disc speed of 4,000 cps or sometimes a speed of 6,000 and 8,000 cps was used. FIG. 1 is a plot of the particle size distribution of the emulsion with the percent of the number of particles plotted as the ordinate and the particle size as the abcissa. Curve 1 is the plot of the differential particle size distribution, and curve 2 is the cumulative total of the particles based on particle size (integration of curve 1). As can be seen from the curve 1, the largest particle size printed on the graph is about 0.5 microns with the smallest being about 0.35 microns. Curve 2 shows that less than 5% of the particles are larger than 0.50 microns and 5% are smaller than about 0.36 microns. At the 25% level in points A and B of curve 1, the particle size is about 0.45 and 0.37, respectively, thus showing the narrow particle size distribution.

With respect to this procedure approximately 67.6% of the surfactant employed was charged to the primary vessel and 33% added with the monomer. The mild agitation of the single turbine stirrer in this equipment gives a large particle size and a larger portion of surfactant then generally necessary, was added to the primary vessel to reduce the size. In plant equipment using 2 and 3 blade turbines and greater agitation, almost all of the surfactant would be added as a delay with the monomer as the agitation will work to keep the particle size small. It should also be noted that the particle size range as shown in FIG. 1 is near the lower end of the preferred range. To increase the size to a better optimum, the surfactant added to the primary vessel should be reduced from 67% to about 50% and the balance added with the delay.

EXAMPLE 2

Semi-gloss Paint Screening Formula

A standard paint formulation for semi-gloss application was used to compare various emulsions prepared by the techniques of Example 1, e.g. Runs 1-9, as well as conventional vinyl acetate-lower alkyl acrylate and acrylic emulsions, e.g. FIGS. 2-5. The formulation was as follows:

| COMPOUND | GRAMS |
| --- | --- |
| Propylene glycol | 65 |
| Tamol 731 | 14 |
| Foamaster 44 | 2 |
| Ti-Pure R-900-titanium dioxide | 275 |

-continued

| COMPOUND | GRAMS |
| --- | --- |
| (disperse and add) | |
| Water | 60 |
| Aerosol OT, 75% sodium dioctyl-succinate | 2 |
| Carbitol acetate | 15 |
| Natrosol 250 MR, 3% Hydroxy Ethyl Cellulose | 75 |
| Merbac 35 Pigment | 1 |
| Ammonium Hydroxide | 1 |
| Water* and/or Natrosol solution | 90 |
| Emulsion @ 55% solids | 460 |

*Water and Natrosol varied to maintain viscosity in commercially usable range, generally 82±2Ku (Krebs Units)

The paint compositions were then tested for print test, color development, accelerated aging, paint viscosity, mini-viscosity, gloss, floating board test, cut film wet adhesion test, levelling by brushout, and Leneta levelling. A brief description of each individual test is as follows:

PRINT TEST

Duplicate drawdowns of the test paints were made on clean glass panels, using a three mil Bird applicator. One panel was allowed to dry for 48 hours at 75° F., 50% relative humidity, and then in an oven at 120° F. for an additional 24 hours. The second panel was dried for 72 hours at 75° F. at 50% relative humidity. After drying, a 1 inch square of cheesecloth (2 layers thick) was placed on each panel and covered with a number 8 rubber stopper. A 500 gram weight was placed on a stopper and then the panel and weights are placed in an oven at 140° F. for 1 hour. The panel and weights were removed from the oven, allowed to cool and the cheesecloth removed. Print was rated on an arbitrary scale from 0-4 with 4 being a perfect score showing no indentation or marks. The test was designed to predict performance of the paint when used to paint windows, doors, and shelves where sticking may occur when the objects are contacted at high temperature.

COLOR DEVELOPMENT

A 1½ gram of Super Imperse X-2687 blue aqueous color dispersion is added to 200 grams of the test paint and the paint was evaluated for depth of color.

ACCELERATED AGING

In this test, an 8 ounce bottle of the test paint was stored in a forced draft oven at a temperature of 120° F., periodically removed, cooled, and the viscosity checked compared to a sample stored at 75° F. The test was conducted for a 4 week period at which time the oven age sample was drawn down next to the sample stored at ambient temperature to check for physical properties such as yellowing, loss in gloss, loss in hiding or other properties which might make it unsuitable for commercial use. The viscosity was measured with a Krebs-Stormer Viscometer at a speed of 200 rpm, and was expressed in Krebs Units K.U.

MINI-VISCOSITY

Mini-viscosity is a measure of the paint viscosity expressed in centipoise, when run on a CRGI/Glidden Rotational Mini-Viscometer attachment for the Krebs-Stormer Viscometer. The attachment gives a high shear rate which approximates shear imparted in brushing out a paint, and correlates to a property called brush drag.

GLOSS

Gloss of the paint composition was measured on drawdowns to obtain a flat plane surface using both a 20° and 60° gloss meter.

FLOATING BOARD TEST

A 6 inch by 6 inch piece of clear white pine was first coated with an alkyd enamel paint and then with an alkyd gloss enamel and allowed to dry for a minimum of 3 days. The test paints were applied to the alkyd coated pine board in liberal quantity and allowed to dry for 3 days at 75° F. and 58% relative humidity. Using a sharp knife or scribe, a series of parallel cuts approximately 1/10 inch apart were made and formed into a 100 square grid pattern. A strip of masking tape was applied to the cut section and rubbed with the thumb to insure contact. The tape then was pulled sharply at a 90° angle, and the percent removed from the alkyl substrate noted. A second series of cuts were made in the top paint film and the board placed face down in tap water. After one hour, the board was removed from water, wiped dry and tape applied to the cross hatched area and pulled. The percent remaining was recorded. A low percent removal of paint indicates good wet adhesion and a high removal indicates poor wet adhesion.

CUT FILM WET ADHESION TEST

A Leneta metal scrub panel was coated with an alkyd enamel using a 7 mil side of a Dow Film Caster and allowed to dry a minimum of three days and maximum of nine days at 75° F. at 50% relative humidity. Test paints were applied to the panel using a drawdown bar suitable to give a 2 mil dry film thickness. The paint was allowed to dry 72 hours at 75° F., 50% relative humidity. A cut was made completely through the surface and down the center of the drawdown of the test paint with the razor blade held at a 45° angle. The panel was placed on a Gardner Washability Machine and scrubbed under water with a standard hog bristle brush, presoaked in water.

If no adhesion failure occurred after 5,000 cycles, a second cut parallel to the first ½ inch apart was made and the cycle repeated an additional 1,000 cycles.

LEVELLING BY BRUSHOUT

Test paints were stirred and applied with a good quality 1½ inch nylon bristle brush to Leneta opacity-display charts, Form 9B. Each paint was applied at the same spreading rate with the panel being weighed before and after painting and then allowed to dry in a horizontal position at 75° F. and 50% relative humidity. Paints were then arbitrarily ranked for levelling and comparing them to a control.

LENETA LEVELLING

The paints are presheared by mechanical mixing and immediately drawndown with a Leneta Test Levelling Bar ont a sealed white chart.

The bar has a series of evenly spaced grooves to deposit a layer of paint in ridges. The charts were dried in a level position at 75° F., and 50% relative humidity. The ridges in the resulting dry films were rated by comparing the drawdown to a set of standards marked 0 to 10, with 10 being perfect in terms of levelling.

Premium and commercial paints typically have a Leneta level of from 3–4.

Figure 2:
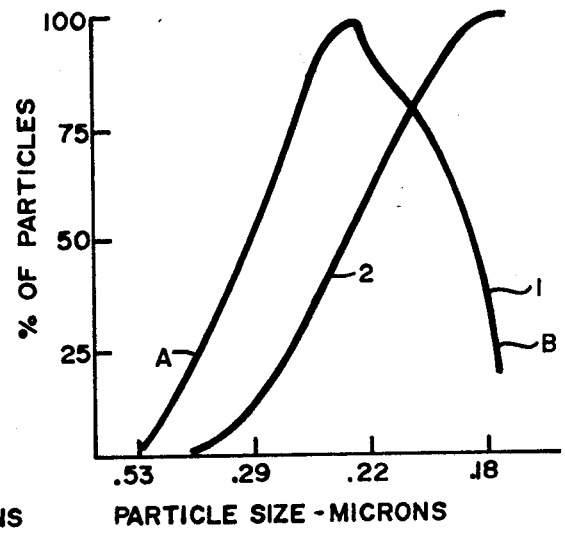
FIG. 2 is a particle size distribution curve for a vinyl acetate-butyl acrylate with 1% of a wet adhesion monomer emulsion formed in a manner to give a particle size distribution outside the range of the invention.
Figure 3:
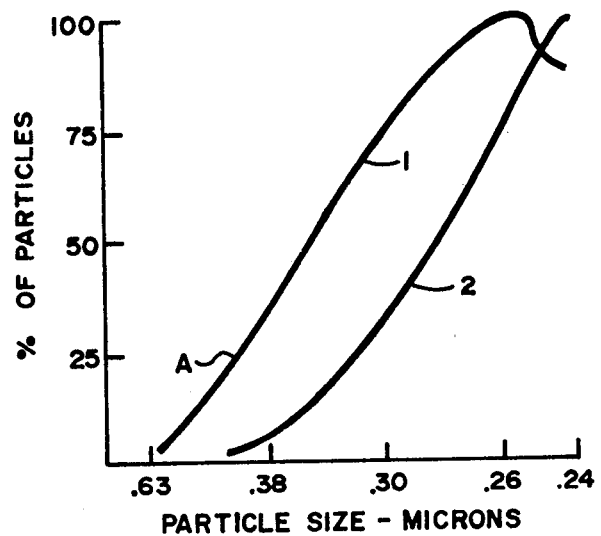
FIG. 3 is a particle size distribution curve of a vinyl acetate-butyl acrylate having a 65% solids content and a particle size distribution outside the invention.

The procedure of Example 1 was repeated, except where the percent surfactant, based on monomer content, percent wet adhesion monomer, and percent protective colloid or hydroxyethyl cellulose was varied. Tables 1 and 2 provide test results of paint compositions made using the test emulsions.

some of the emulsions are prior art, i.e., FIGS. 2 and 3, the results show when the particle size distribution is outside the range specified poorer overall properties result. The importance of a wet adhesion monomer is well shown as those emulsions not having the monomer, i.e., FIGS. 3, 4 and 5, failed the appropriate wet adhesion tests. Run 17 is a terpolymer emulsion slightly outside the preferred particle size range. Flow and lev-

TABLE 1

Figure 4:
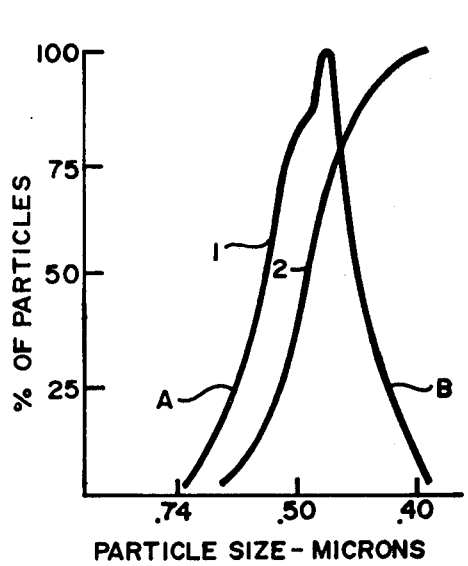
FIG. 4 is a particle size distribution curve of a vinyl acetate-butyl acrylate emulsion slightly outside the present particle size specification.
Figure 7:
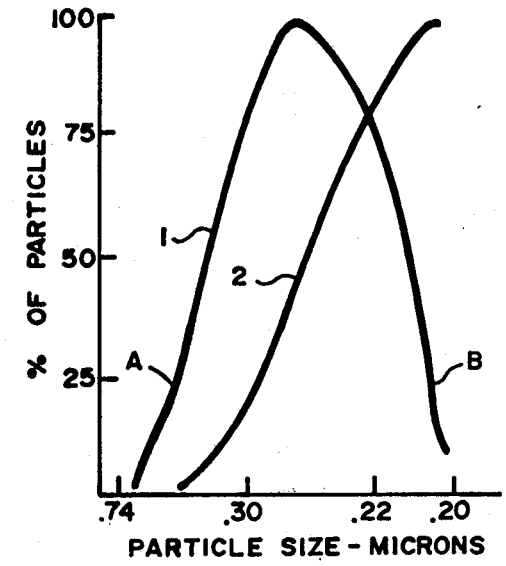
FIG. 7 is a particle size distribution curve for a vinyl acetate-ethylene-vinyl chloride-wet adhesion monomer tetrapolymer outside the present particle size distribution range.
Figure 6:
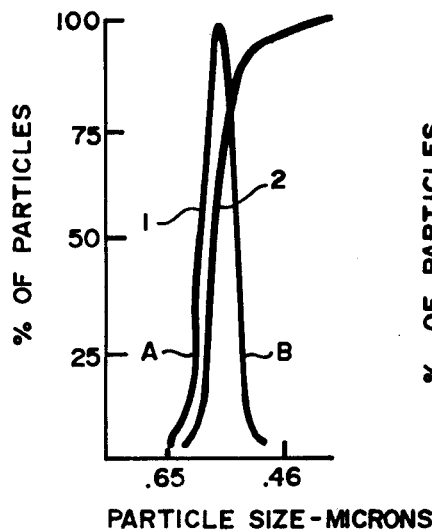
FIG. 6 is a particle size distribution curve for a vinyl acetate-ethylene emulsion containing an allylic functional wet adhesion monomer with a Tg of $+22.5°$ C. and having a particle size distribution curve within the range of the invention.
Figure 5:
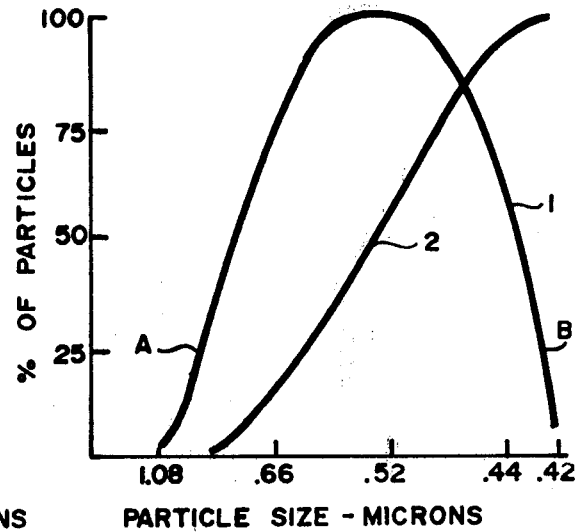
FIG. 5 is a particle size distribution curve for a vinyl acetate-ethylene emulsion having a copolymer Tg of $2 \pm 2°$ C. which is outside the invention.

| Run | % HEC | % Surfactant | Wet Adhesion Monomer | Initial Gloss 60° | Initial Gloss 20° | Leneta Levelling | Print Resistance | Cut Film 5000 |
|---|---|---|---|---|---|---|---|---|
| 1 | 1.50 | 2.50 | 0.75 | 27.4 | 1.5 | 3 | 4⁻ | P |
| 2 | 1.50 | 3.25 | 0.75 | 44.5 | 5 | 1 | 4⁻ | P |
| 3 | 1.00 | 2.60 | 0.75 | 48 | 6.9 | 3⁻ | 3⁻ | P |
| 4 | 1.00 | 2.60 | 0.75 | 49 | 6.1 | 2 | 3 | P |
| 5 | 0.80 | 3.66 | 0.75 | 46.2 | 5.5 | 2 | 3⁺ | P |
| 6 | 0.80 | 3.0 | 0.75 | 52 | 9.1 | 2⁺ | 3 | P |
| 7 | 0.80 | 3.25 | 0.75 | 63 | 15 | 2 | 2⁻ | P |
| 8 | 0.80 | 3.25 | 0.75 | 53 | 8.5 | 2 | 2⁺ | P |
| 9 | 0.40 | 4.20 | 0.75 | 6.6 | 17.2 | 1 | 2⁺ | P |
| 10 | FIG. 2 emulsion | | | 70 | — | 4 | 1 | P |
| 11 | FIG. 3 emulsion | | | 60 | — | 2 | 1 | F |
| 12 | FIG. 4 emulsion | | | 60 | — | 4 | — | F |
| 13 | FIG. 5 emulsion | | | 41 | — | 4⁻ | — | F |
| 14 | FIG. 6 emulsion | | | 52 | — | 4 | 3 | P |
| 15 | FIG. 7 emulsion | | | 56.3 | — | 2⁺ | 2⁺/3 | P |

P = Pass
F = Fail

TABLE 2

| Run | Cut Film 1000 | Floating Board Dry | Floating Board Wet | Cheese Cloth Peel | Mini-Viscosity | Color Acceptance | Print 1 Day 120° F. |
|---|---|---|---|---|---|---|---|
| 1 | P | 0 | 0 | 4 | — | 4 | — |
| 2 | P | 6 | 68 | — | 1.72 | 4 | — |
| 3 | P | 5 | 1 | 3 | — | 4 | — |
| 4 | P | 6 | 9 | — | 1.40 | 4 | 4⁻ |
| 5 | P | 0 | 5 | — | 1.40 | 4 | 4⁻ |
| 6 | P | 0 | 1 | 4 | — | 4 | — |
| 7 | P | 0 | 2 | — | 1.24 | 4 | 3⁺ |
| 8 | P | 0 | 98 | — | 1.29 | 4 | 3⁺ |
| 9 | P | 0 | 3 | 3⁺ | — | 3⁺ | — |
| 10 | P | 0 | 0 | | | | |
| 11 | F | 30 | 100 | | | | |
| 12 | F | — | — | | | | |
| 13 | F | — | — | | | | |
| 14 | P | 0 | 0 | | | | |
| 15 | P | 2 | 0 | | | | |

P = Pass
F = Fail

In reviewing Tables 1 and 2, several features become apparent. In runs 1–3, the concentration of hydroxyethyl cellulose was slightly high causing an excess of large particles; and as a result, the gloss was poor. On the other hand, leveling and print were good. Run 11 employed a low concentration of hydroxyethyl cellulose and high concentration of surfactant; and as a result, leveling and print were inferior. In addition, gloss was poor. Runs 5, 6, and 7, which used about 0.8% hydroxyethyl cellulose and 3.00–3.5% surfactant with about 60% in the primary vessel resulted in a particle size which gave good gloss, leveling, etc., and superior to those at slightly different values. Run 5 is closest to the formulation as shown in FIG. 1 Better results and comparable to FIG. 7, might have done better in the FIG. 1 formulation at lower surfactant concentrations.

Other results in Table 1 show comparison of the emulsion over a wide particle size range. Although eling for a paint composition are slightly undesirable, and this is attributed to the large amount of fines.

EXAMPLE 3

A vinyl acetate-ethylene-wet adhesion terpolymer was prepared in accordance with the general procedure of Example 1. The procedure involved charging the premix to a primary vessel and then pressurizing the vessel with ethylene to the appropriate pressure. In the actual case used, the pressure was about 700 psig. The second and third mixtures were prepared in accordance with those prepared in secondary vessells 1 and 2 except that in secondary vessel 1, vinyl acetate was the only monomer used. These mixtures then were added to the primary vessel as a delay with the vinyl acetate being maintained between 3 to 5%. The temperature as in Example 1, was maintained at about 62° C.

The resulting emulsion formed by this polymerization had a Tg of +22.5° C. and had a particle size distribution as shown in FIG. 6.

EXAMPLE 4

The procedure of Example 1 was repeated except that the wet adhesion monomer used was N-[β-(α-methylacryloxyacetamido)-ethyl]-N,N'-ethylene urea. The particle size distribution was essentially the same and was prepared in accordance with Example 7 of U.S. Pat. No. 2,881,155. When evaluated in accordance with the procedures in Example 2, the following results were obtained: 60° gloss 54, Leneta levelling 4+, and the wet adhesion was good in that the paint passed the cut film and floating board test.

What is claimed is:

1. In a paint composition comprising water, pigment, and a latex comprising from about 40 to 70% of film forming polymerized resin particles containing at least 25% of vinyl acetate by weight, and from about 5–20% of a monomer selected from the group consisting of ethylene and a lower alkyl acrylate, the improvement which comprises said polymerized resin particles being substantially spherical in shape and not more than about 5% of the total number of particles in the latex have a size greater than about 0.65 microns and not more than about 5% of the total number of particles have a particle size less than 0.33 microns, and the differential between 25% of the largest particles and 25% of the smallest particles is not more than 0.15 microns.

2. The composition of claim 1 wherein said polymerized resin particulate contains an alkyl acrylate selected from the group consisting of butyl, methyl, and 2-ethyhexyl acrylate.

3. The composition of claim 2 wherein said resin particle has from 80–95% vinyl acetate.

4. The composition of claim 3 wherein at least 90% of the total particles in the resin emulsion has a particle size of from 0.35–0.6 microns.

5. The composition of claim 2 having wet adhesion imparted therein by the presence of from about 0.2–2.5% of a wet adhesion monomer selected from the group consisting of olefinic unsaturated having pendent ureido functionality, and allyl urea, polymerized in said resin particles.

6. The composition of claim 2, 3, 4, or 5 wherein said wet adhesion monomer for imparting wet adhesion is selected from the group consisting of the formulas:

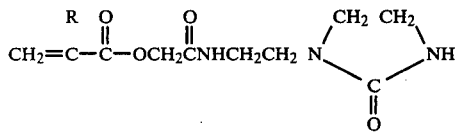

$$CH_2=CH-CH_2NHC-NH_2$$
$$\qquad\qquad\qquad\|$$
$$\qquad\qquad\qquad O$$

7. The composition of claim 5 wherein said monomer is an acrylate, and said acrylate is butyl acrylate.

8. The composition of claim 7 wherein said resin particulate contains from about 80 to 95% vinyl acetate, 5 to 18.5% butylacrylate and from about 0.5 to 1.5% of the wet adhesion monomer.

9. In a process for forming a film forming vinyl acetate containing latex composition with the vinyl acetate content in the polymer being at least 25% and from about 5 to 20% of a monomer selected from the group consisting of ethylene and a lower alkyl acrylate for semi-gloss paint application by polymerizing a reaction mixture of vinyl acetate, water, protective colloid, surfactant free radical initiator and activator, the improvement for producing polymer particles within a size range of from 0.33–0.65 microns and where the differential between 25% of the largest particles and 25% of the smallest particles is 0.15 microns which comprises:

forming a premix by charging water, free radical initiator from 0.8–1.5% protective colloid based on the weight of the monomers, and from 0–70% of the surfactant to be used within the range of 0.05–5% based on the latex by weight to a first vessel;

forming a second mixture comprising vinyl acetate and the remainder of the surfactant;

charging said second mixture to said first vessel and adding activator at a rate such that during addition of the vinyl acetate the percent of unreacted vinyl acetate in the latex is maintained from about 3–5% by weight of the latex;

reducing the vinyl acetate content to less than 0.5% by weight of the latex for having a finished emulsion;

measuring the particle size of the particles in the emulsion; and then repeating the process and increasing the level of protective colloid and reducing the proportion of surfactant in the pimary vessel if the particle size is too small, and decreasing the level of protective colloid and increasing the proportion of surfactant in the first vessel if the particle size is too large.

10. The process of claim 9 wherein the polymerization is carried out at a temperature of from 40°–70° C.

11. The process of claim 1 wherein from 0.2–2.5% of a wet adhesion monomer selected from the group consisting of those having terminal olefinic unsaturation and pendent ureido functionality, and allyl urea is interpolymerized with the monomers.

12. The composition of claim 5 wherein said resin particle has from 25–65% vinyl chloride, 30–65% vinyl acetate, and 10–15% ethylene.

13. The process of claim 10 wherein the polymer in the latex composition contains from 25–65% vinyl chloride, 30–65% vinyl acetate, 10–15% ethylene and 0.2–2.5% of a wet adhesion monomer.

* * * * *